United States Patent
Yu et al.

(10) Patent No.: US 10,823,049 B2
(45) Date of Patent: Nov. 3, 2020

(54) METHOD OF PREVENTING SURGE FOR VEHICLE

(71) Applicants: Hyundai Motor Company, Seoul (KR); Kia Motors Corp., Seoul (KR)

(72) Inventors: Seung Eun Yu, Bucheon-si (KR); Haeng Pyo Heo, Hwaseong-si (KR); Min Taek Kim, Seoul (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 90 days.

(21) Appl. No.: 16/121,925

(22) Filed: Sep. 5, 2018

(65) Prior Publication Data

US 2019/0360391 A1 Nov. 28, 2019

(30) Foreign Application Priority Data

May 28, 2018 (KR) .................. 10-2018-0060131

(51) Int. Cl.
*F02B 37/10* (2006.01)
*F02D 41/00* (2006.01)
(Continued)

(52) U.S. Cl.
CPC ............ *F02B 37/10* (2013.01); *F02B 37/183* (2013.01); *F02D 41/0007* (2013.01);
(Continued)

(58) Field of Classification Search
CPC .. F02B 37/10; F02B 37/183; F02B 2037/125; F02D 41/0007; F02D 41/0077;
(Continued)

(56) References Cited

U.S. PATENT DOCUMENTS

| 4,930,315 A * | 6/1990 | Kanesaka | ............... F02B 29/00 60/600 |
| 6,938,420 B2 * | 9/2005 | Kawamura | ............. F02B 33/34 60/612 |

(Continued)

FOREIGN PATENT DOCUMENTS

| JP | 2015-121106 A | 7/2015 |
| JP | 2017-014936 A | 1/2017 |

(Continued)

*Primary Examiner* — Hung Q Nguyen
*Assistant Examiner* — Susan E Scharpf
(74) *Attorney, Agent, or Firm* — Morgan, Lewis & Bockius LLP

(57) ABSTRACT

A method of preventing surge for a vehicle may include detecting, by a controller, whether tip-out of an accelerator pedal is detected, comparing, by the controller, a difference value, obtained by subtracting an exhaust pressure from an intake pressure in a combustion chamber of an engine, with a predetermined reference value when the tip-out of the accelerator pedal is detected, driving, by the controller, a supercharger disposed at the rear end portion of a turbocharger at a predetermined number of revolutions per minute, which is lower than a normal number of revolutions per minute, when the difference value is greater than the reference value, and opening a bypass valve, which performs opening or closing operation and is disposed in a bypass line that diverges from an upstream point of the supercharger and is connected to a downstream point of the supercharger.

7 Claims, 3 Drawing Sheets

(51) Int. Cl.
*F02B 37/18* (2006.01)
*F02B 37/12* (2006.01)

(52) U.S. Cl.
CPC .... *F02B 2037/125* (2013.01); *F02D 41/0077* (2013.01); *F02D 2200/602* (2013.01)

(58) Field of Classification Search
CPC ......... F02D 41/1448; F02D 2200/0406; F02D 2200/602
USPC ........................................................ 701/105
See application file for complete search history.

(56) References Cited

U.S. PATENT DOCUMENTS

| | | | |
|---|---|---|---|
| 7,529,614 B1* | 5/2009 | Muller | F02B 37/16 |
| | | | 123/559.1 |
| 8,176,735 B2* | 5/2012 | Komatsu | F02B 37/013 |
| | | | 123/562 |
| 9,909,490 B2* | 3/2018 | Hand, III | F02D 41/1448 |
| 2013/0305716 A1* | 11/2013 | Rollinger | F02B 37/00 |
| | | | 60/605.2 |
| 2016/0363043 A1* | 12/2016 | Hirayama | F02B 37/04 |
| 2017/0122229 A1* | 5/2017 | Ossareh | F02D 41/0007 |
| 2017/0122241 A1* | 5/2017 | Xiao | F02D 9/02 |
| 2017/0138278 A1* | 5/2017 | Xiao | F02D 41/0005 |
| 2019/0063347 A1* | 2/2019 | Xiao | F02D 41/10 |

FOREIGN PATENT DOCUMENTS

| | | |
|---|---|---|
| JP | 6115580 B2 | 4/2017 |
| JP | 6128081 B2 | 5/2017 |
| KR | 10-2005-0068989 A | 7/2005 |

\* cited by examiner

METHOD OF PREVENTING SURGE FOR VEHICLE

CROSS-REFERENCE TO RELATED APPLICATION

The present application claims priority to Korean Patent Application No. 10-2018-0060131, filed on May 28, 2018 in the Korean Intellectual Property Office, the entire contents of which is incorporated herein for all purposes by this reference.

BACKGROUND OF THE INVENTION

Field of the Invention

The present invention relates to a method of preventing the occurrence of surge for a vehicle when surge is predicted to occur due to tip-out.

Description of Related Art

In general, various devices for enhancing engine performance and improving fuel efficiency are disposed in vehicles.

A representative one of these devices is a turbocharger. The turbocharger serves to improve engine performance and fuel efficiency by compressing intake air to be supplied to an engine by exhaust gas.

However, the turbocharger is incapable of sufficiently achieving a reduction in fuel consumption, improved fuel efficiency, and environmental friendliness, which have been increasingly required in recent years due to high oil prices and stringent environmental regulations in many countries.

Thus, in addition to the turbocharger, a supercharger is disposed in recently developed vehicles. The supercharger is configured to compress intake air to be supplied to an engine by the engine.

In the case in which an engine system includes both a turbocharger and a supercharger, in a turbo lag state at a low speed, a bypass control valve, which is controlled to allow intake air to bypass the supercharger, is shut off to connect the supercharger and the turbocharger in series, and accordingly the turbocharger and the supercharger may be driven at the same time to draw air, improving the response speed of the engine and the torque at a low speed.

On the other hand, in a normal driving state, the bypass control valve is opened to interrupt the connection between the supercharger and the turbocharger, and accordingly air is drawn in without passing through the supercharger, minimizing unnecessary consumption of fuel and power.

In a vehicle provided with the aforementioned turbocharger, when the accelerator pedal operation changes to tip-out, with a sharp decrease in the engine RPM, a pressure reversal occurs such that air is not supercharged to a combustion chamber from the turbocharger and thus the pressure of the supercharged intake air instantaneously increases above the pressure of the exhaust air from the combustion chamber.

At the instant time, a surge phenomenon occurs such that the partial pressure of air is generated in a compressor of the turbocharger, the air supercharged by the compressor flows backwards to an entrance, and thus the temperature of the air rises.

To prevent surge that occurs when the intake pressure increases above the exhaust pressure at tip-out, the related art utilizes a method of decreasing the pressure of an intake manifold by instantaneously opening an EGR valve so that the air in the intake side is discharged to the exhaust side thereof.

However, while the air in the intake side is directly discharged to the exhaust side, low-temperature gas directly flows to a post-treatment device, and thus the temperature of a catalyst in the post-treatment device is decreased.

This causes a delay in an activation timing of the catalyst until the temperature of the catalyst rises, with the result that the amount of emission materials increases sharply.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method of preventing surge for a vehicle by drawing air using a supercharger disposed to the rear end portion of a turbocharger and a supercharger bypass line when surge is predicted to occur due to tip-out.

In accordance with an aspect of the present invention, the above and other objects may be accomplished by the provision of a method of preventing surge for a vehicle, the method including detecting, by a controller, whether tip-out of an accelerator pedal is detected, comparing, by the controller, a difference value, obtained by subtracting an exhaust pressure from an intake pressure in a combustion chamber of an engine, with a predetermined reference value when the tip-out of the accelerator pedal is detected, driving, by the controller, a supercharger disposed at the rear end portion of a turbocharger at a predetermined number of revolutions per minute, the predetermined number of revolutions per minute being lower than a normal number of revolutions per minute, when the difference value is greater than the reference value, and opening a bypass valve, the bypass valve being configured to perform opening or closing operation and being disposed in a bypass line that diverges from an upstream point of the supercharger and is connected to a downstream point of the supercharger.

When the depression amount of the accelerator pedal is 0 and when a change rate of the depression amount of the accelerator pedal is less than a reference rate, the controller may be configured to determine that tip-out of the accelerator pedal is detected.

The predetermined number of revolutions per minute may be a number of revolutions per minute that allows 50% of inflowing intake air to pass through the supercharger without a change in pressure.

The controller may read the predetermined number of revolutions per minute from a data map that has been stored therein in accordance with a flow rate of intake air, and drives the supercharger at the predetermined number of revolutions per minute.

The controller may perform the comparing again after the opening the bypass valve.

The method may further include driving, by the controller, the supercharger at the normal number of revolutions per minute when the difference value is equal to or less than the reference value, and closing the bypass valve.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
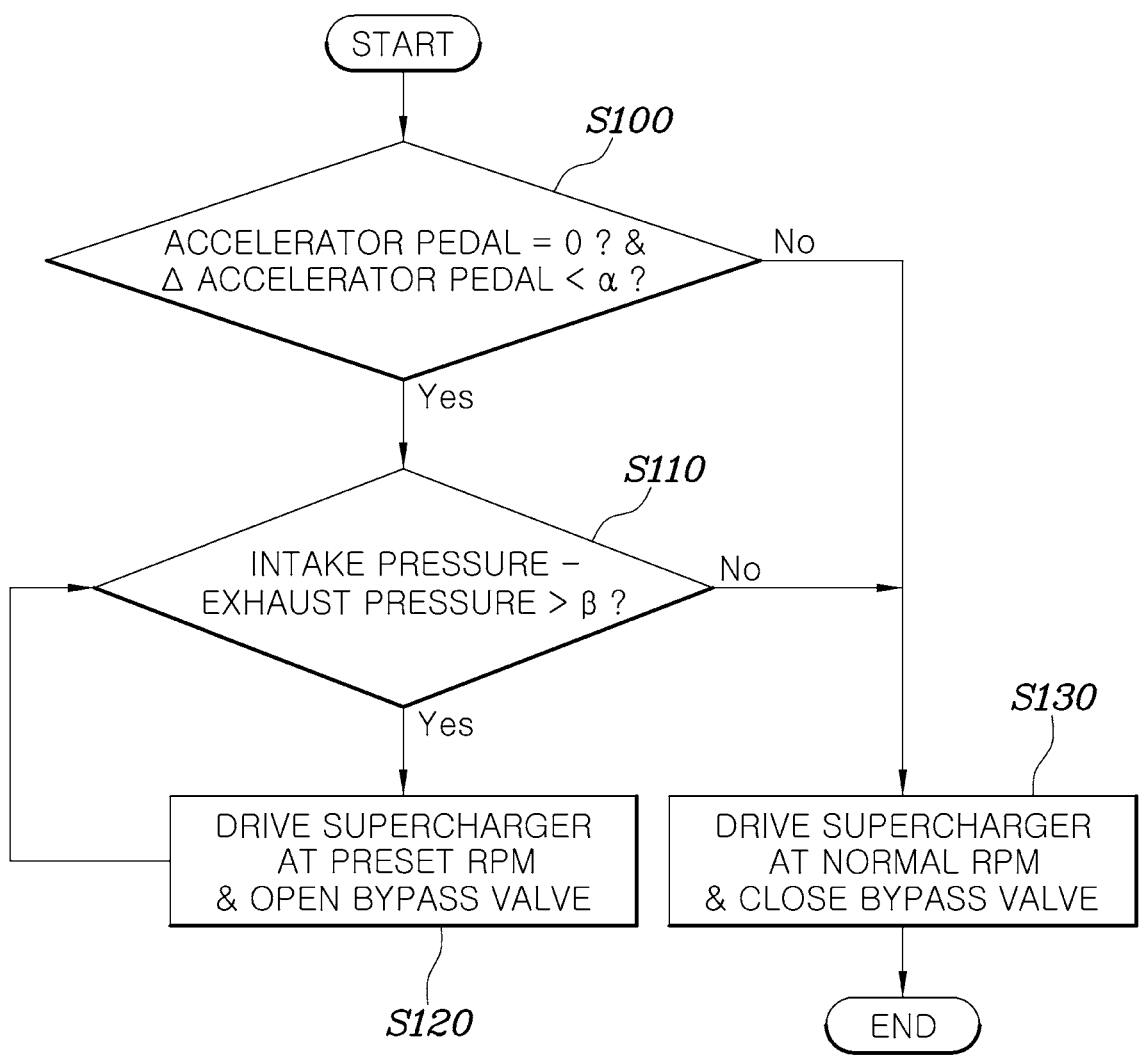
FIG. 1 is a flowchart showing a method of preventing surge for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to the exemplary embodiments of the present invention, examples of which are illustrated in the accompanying drawings.

Figure 2:
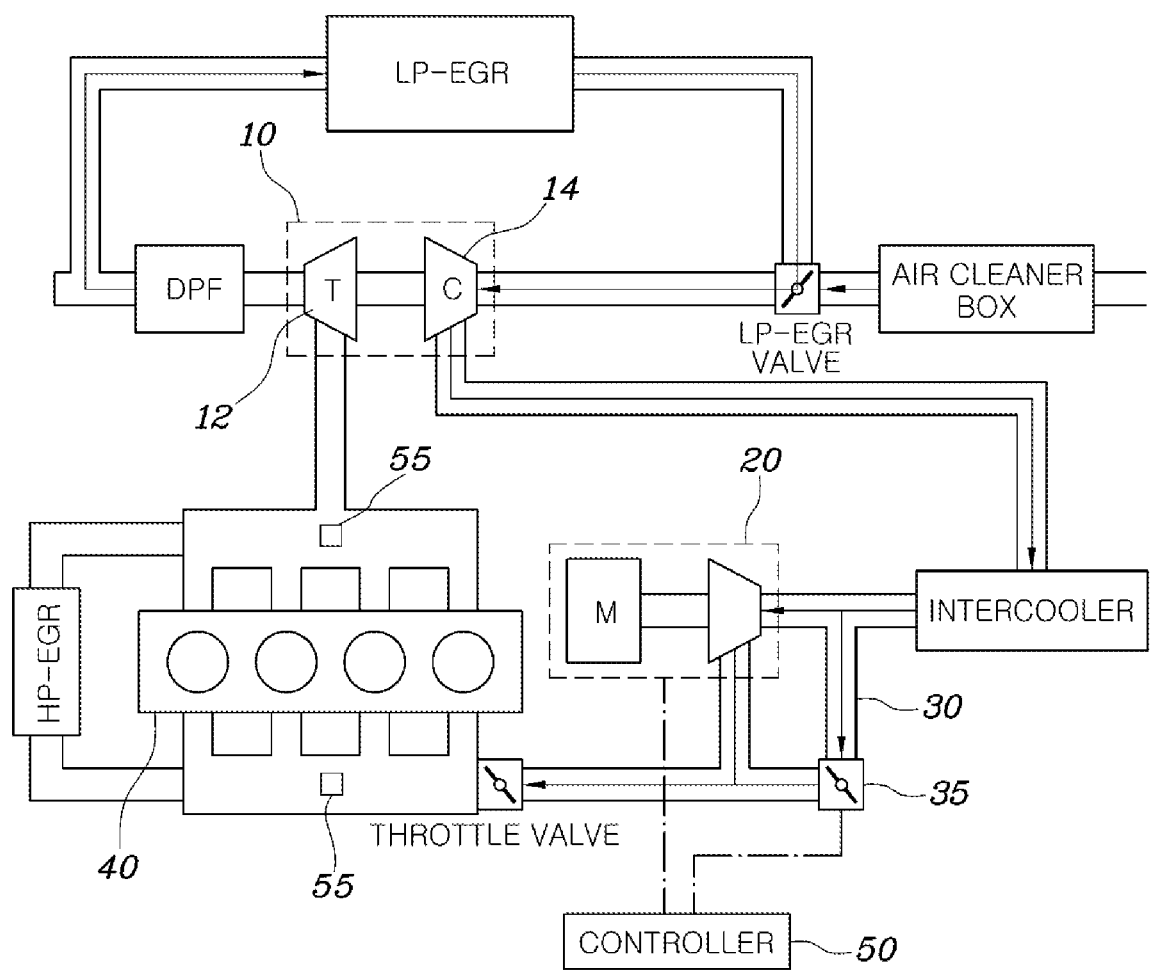
FIG. 2 is a view illustrating a device configured for preventing surge for a vehicle in the state in which surge prevention is required.

FIG. 1 is a flowchart showing a method of preventing surge for a vehicle according to an exemplary embodiment of the present invention, and FIG. 2 is a view illustrating a device configured for preventing surge for a vehicle in the state in which surge prevention is required.

Referring to FIG. 1 and FIG. 2, the method of preventing surge for a vehicle according to an exemplary embodiment of the present invention may include a step (S100) of detecting, by a controller 50, whether tip-out of an accelerator pedal is detected, a step (S110) of comparing, by the controller 50, a difference value, which is obtained by subtracting an exhaust pressure from an intake pressure in a combustion chamber of an engine 40, with a predetermined reference value when the tip-out of the accelerator pedal is detected, and a step (S120) of driving, by the controller 50, a supercharger 20, which is disposed at the rear end portion of a turbocharger 10, at a predetermined number of revolutions per minute (RPM), which is lower than a normal number of revolutions per minute, when the difference value is greater than the reference value, and of opening a bypass valve 35, which performs opening or closing operation and is disposed in a bypass line 30 that diverges from an upstream point of the supercharger 20 and is connected to a downstream point of the supercharger 20.

As shown in FIG. 2, in the intake and exhaust structure of a vehicle, to which the turbocharger 10 and the supercharger 20 are disposed, air to be drawn in into the engine 40 is selectively compressed by a compressor 14 of the turbocharger 10 and a compressor of the supercharger 20, and exhaust gas discharged from the engine 40 rotates a turbine 12 of the turbocharger 10 to supply power to the compressor 14, which is disposed on the same axis as the turbine 12.

The exhaust gas discharged from the engine 40 is discharged to the outside via the turbine 12 of the turbocharger 10 and an exhaust gas post-treatment device (Diesel Particulate Filter (DPF)). At the instant time, some of the exhaust gas is transferred back to the intake side of the engine 10 through low pressure-exhaust gas recirculation (LP-EGR).

The exhaust gas, which is transferred through the LP-EGR, is compressed together with air supplied from an air cleaner box via the compressor 14 of the turbocharger 10.

The intake air, compressed by the compressor 14 of the turbocharger 10, passes through an intercooler. The intercooler is provided at the rear end portion thereof with a line for transferring the intake air to the supercharger 20 and with the bypass line 30 that connects an upstream point of the supercharger 20 to a downstream point thereof to allow the intake air to bypass the supercharger 20.

Here, the bypass valve 35 for controlling the flow of the intake air is disposed in the bypass line 30. The intake air is transferred to the engine 10 after passing through the supercharger 20 or bypassing the supercharger 20 depending on the operation of the bypass valve 35.

In the related art, when the supercharger 20 operates, the bypass valve 35 is completely shut off so that the intake air flows only through the supercharger 20, and when the supercharger 20 does not operate, the bypass valve 35 is completely opened so that all of the intake air bypasses the supercharger 20.

However, according to an exemplary embodiment of the present invention, when surge is predicted to occur due to tip-out of the accelerator pedal, the supercharger 20 is driven at the predetermined number of revolutions per minute, which is lower than the normal number of revolutions per minute, and at the same time, the bypass valve 35 is controlled to be opened. Accordingly, the effective capacity of the rear side of the compressor 14 of the turbocharger 10 is instantaneously increased, and thus the intake pressure is decreased. As a result, it is possible to prevent surge that occurs when the intake pressure increases above the exhaust pressure of the combustion chamber.

Referring to FIG. 1 and FIG. 2, when the depression amount of the accelerator pedal is 0 and when the change rate of the depression amount of the accelerator pedal is less than a predetermined reference rate $\alpha$, the controller 50 determines that tip-out of the accelerator pedal is detected.

To the present end, the controller 50 is configured to receive data related to the intake pressure and the exhaust pressure in the combustion chamber of the engine 40 from pressure sensors 55 located in intake and exhaust manifolds of the engine, respectively.

In the state of tip-out of the accelerator pedal, the number of revolutions per minute of the turbocharger 10 decreases gradually due to inertia of the turbine wheel of the turbocharger 10 and residual energy in the exhaust side, whereas the flow rate of the intake air decreases at the same time as the tip-out, and thus the intake pressure increases instantaneously above the exhaust pressure, leading to surge.

Therefore, it is important to predict the occurrence of surge by accurately determining the condition corresponding to the tip-out of the accelerator pedal. According to an exemplary embodiment of the present invention, to accurately and instantly detect the tip-out of the accelerator pedal, a determination is not only made as to whether the depression amount of the accelerator pedal is 0, but a comparison is also made between the change rate of the depression amount of the accelerator pedal and a predetermined reference rate $\alpha$.

Upon detecting the tip-out of the accelerator pedal in the manner described above, to more accurately determine the possibility of surge, the controller 50 compares a difference value, which is obtained by subtracting the exhaust pressure from the intake pressure of the combustion chamber of the engine, with a predetermined reference value R (S110).

To the present end, the controller 50 is configured to receive data related to the intake pressure and the exhaust pressure of the combustion chamber of the engine 40 from separately provided pressure sensors 55.

That is, upon detecting the situation in which the intake pressure increases above the exhaust pressure of the combustion chamber of the engine, the controller 50 determines the possibility of surge, in which air flows backwards, and performs a subsequent logic operation. At the instant time, an error may occur during the process of measuring the pressures. For the present reason, the controller 50 compares a difference value obtained by subtracting the exhaust pressure from the intake pressure with the reference value R in which an error is reflected, preventing the opening step (S120) from being performed in the situation in which the intake pressure is not higher than the exhaust pressure.

If a difference value, which is obtained by subtracting the exhaust pressure from the intake pressure of the combustion chamber of the engine, is greater than the reference value the controller 50 drives the supercharger 20 at the predetermined number of revolutions per minute, which is lower than the normal number of revolutions per minute that has been mapped in advance, and opens the bypass valve 35, with the result that the intake capacity of the rear side of the compressor 14 of the turbocharger 10 is maximized, and consequently the intake pressure is decreased.

At the instant time, as indicated by the arrows in FIG. 2, the intake air flows through the supercharger 20 as well as the bypass line 30, and accordingly, the intake capacity is maximized. As a result, the intake pressure is decreased.

Here, the predetermined number of revolutions per minute is a number of revolutions per minute that allows substantially 50% of the inflowing intake air to pass through the supercharger 20 without a change in pressure.

That is, half of the inflowing intake air is transferred to the engine 40 via the supercharger 20, and the remaining half thereof is transferred to the engine 40 via the bypass line 30. Accordingly, the intake capacity is maximized, and thus the intake pressure is decreased. Therefore, surge is prevented.

Here, if the number of revolutions per minute of the supercharger 20 is excessively high, as the intake air is compressed, the intake pressure of the combustion chamber of the engine is increased, which causes the occurrence of surge. Thus, the number of revolutions per minute of the supercharger 20 may be set to a value that allows the intake air to pass through the supercharger 20 without a change in pressure.

At the instant time, the controller 50 may read the predetermined number of revolutions per minute from a data map, which has been stored therein in advance, in accordance with the flow rate of the intake air, and may drive the supercharger 20 at the predetermined number of revolutions per minute.

That is, the controller 50 has stored in advance therein a data map, to which the flow rate of the intake air is input and which outputs the predetermined number of revolutions per minute. Accordingly, the controller 50 is configured for rapidly driving the supercharger 20 without a separate determination process by instantly determining the predetermined number of revolutions per minute using the received data related to the flow rate of the intake air.

After the opening step (S120), the controller 50 in an exemplary embodiment of the present invention performs the comparing step (S110) again.

Furthermore, when it is determined in the comparing step (S110) that the difference value is equal to or less than the reference value, the method according to an exemplary embodiment of the present invention may further include a step (S130) of driving, by the controller 50, the supercharger 20 at the normal number of revolutions per minute and of closing the bypass valve 35.

In other words, when the difference value obtained by subtracting the exhaust pressure from the intake pressure is equal to or less than the reference value $\beta$, the controller 50 determines that surge will not occur. At the instant time, the controller 50 drives the supercharger 20 at the normal number of revolutions per minute and closes the bypass valve 35 according to the existing control method, ensuring smooth compression of the intake air through the supercharger 20.

Here, the normal number of revolutions per minute is a number of revolutions per minute that allows all of the inflowing intake air to pass through the supercharger 20.

Figure 3:
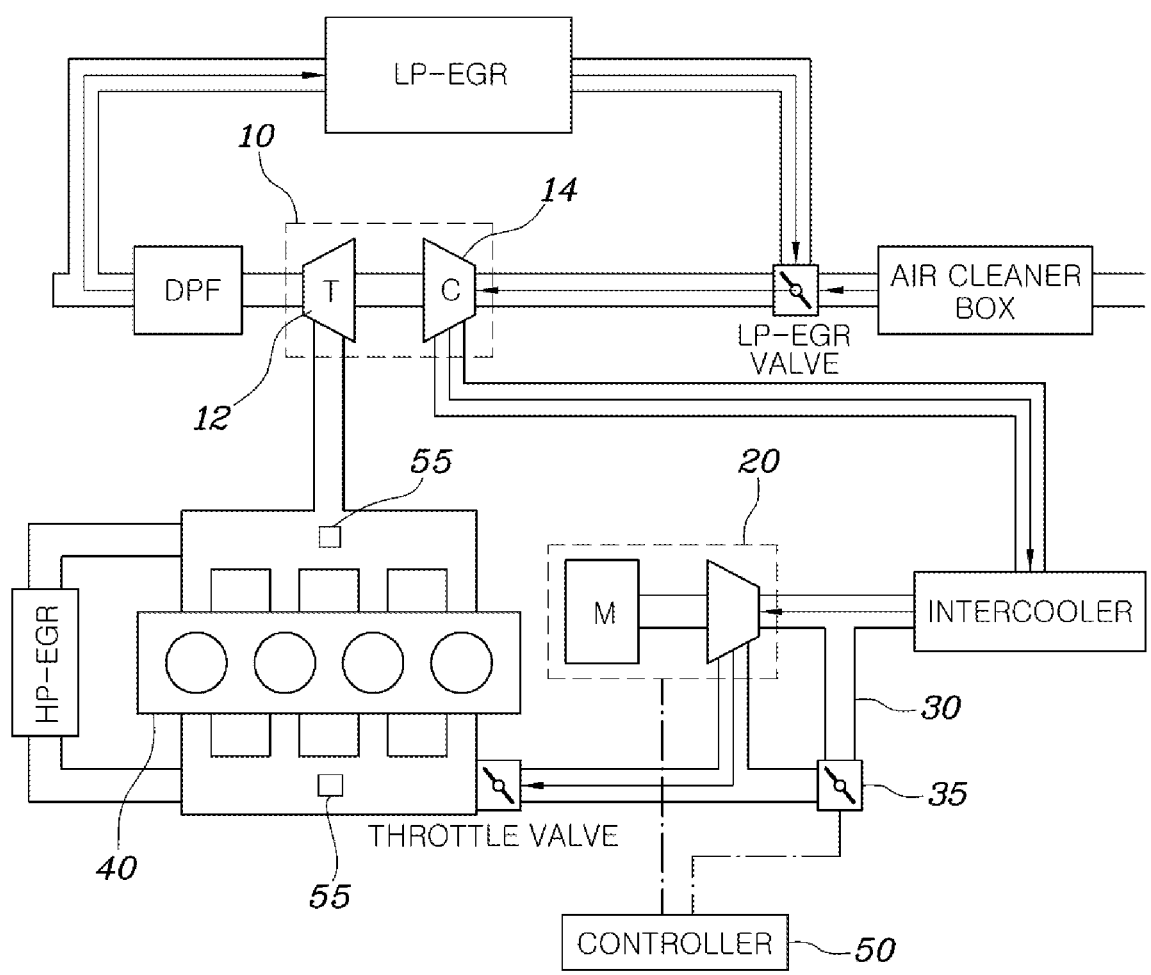
FIG. 3 is a view illustrating the device configured for preventing surge for a vehicle in the state in which surge prevention is not required.

FIG. 3 is a view illustrating the device configured for preventing surge for a vehicle in the state in which surge prevention is not required. As illustrated, when the supercharger 20 is driven at the normal number of revolutions per minute and the bypass valve 35 is shut off, the intake air is transferred to the engine 40 only via the supercharger 20, as indicated by the arrows in FIG. 3.

As is apparent from the above description, according to the method of preventing surge for a vehicle including the above-described configuration, it is possible to prevent the occurrence of surge due to tip-out of the accelerator pedal, improving durability and the noise, vibration and harshness (NVH) characteristics of the compressor of the turbocharger.

Furthermore, since it is not necessary to perform control for directly discharging low-temperature intake air to the exhaust side, it is possible to prevent deterioration in temperature-rising and temperature-maintaining performance of a catalyst.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of preventing surge for a vehicle, the method comprising:
   determining, by a controller, when tip-out of an accelerator pedal is detected;
   comparing, by the controller, a difference value with a predetermined reference value when the tip-out of the accelerator pedal is detected, wherein the difference value is obtained by subtracting an exhaust pressure out of a combustion chamber of an engine from an intake pressure into the combustion chamber;
   driving, by the controller, a supercharger disposed at a rear end portion of a turbocharger at a first predetermined number of revolutions per minute (RPM) when the difference value is greater than the predetermined reference value, and opening a bypass valve,
   wherein the first predetermined number of the RPM is lower than a second predetermined number of the RPM,
   wherein the bypass valve is disposed in a bypass line that diverges from an upstream point of the supercharger and is connected to a downstream point of the supercharger, and the bypass valve is controlled by the controller to perform opening or closing operation of the bypass line, and
   wherein the controller is configured to receive data related to the intake pressure into the combustion chamber and the exhaust pressure out of the combustion chamber of the engine, the intake pressure and the exhaust pressure measured by pressure sensors.

2. The method according to claim 1, wherein, when a depression amount of the accelerator pedal is zero and when a change rate of the depression amount of the accelerator pedal is less than a reference rate, the controller is configured to determine that the tip-out of the accelerator pedal is detected.

3. The method according to claim 1, wherein the first predetermined number of the RPM is a number of RPM which allows 50% of inflowing intake air to pass through the supercharger without a change in pressure thereof.

4. The method according to claim 1, wherein the controller reads the first predetermined number of the RPM from a data map that has been stored therein in accordance with a flow rate of intake air.

5. The method according to claim 1, wherein the controller is configured to perform the comparing again after the opening the bypass valve.

6. The method according to claim 1, further including:
   driving, by the controller, the supercharger at the second predetermined number of the RPM when the difference value is equal to or less than the predetermined reference value, and closing the bypass valve.

7. The method according to claim 1, wherein, when a depression amount of the accelerator pedal is not equal to zero or a change rate of the depression amount of the accelerator pedal is equal to or greater than a reference rate, the controller is configured to drive the supercharger at the second predetermined number of the RPM and to close the bypass valve.

* * * * *